(12) United States Patent
Barve et al.

(10) Patent No.: US 11,061,924 B2
(45) Date of Patent: Jul. 13, 2021

(54) MULTI-REGION, MULTI-MASTER REPLICATION OF DATABASE TABLES

(71) Applicant: Amazon Technologies, Inc., Seattle, WA (US)

(72) Inventors: Asmita Barve, Natick, WA (US); Richard Shawn Bice, Sammamish, WA (US); Tate Andrew Certain, Seattle, WA (US); Sanket Vishram Chandorkar, Pacifica, CA (US); Derek William Richard Chen-Becker, Centenneial, CO (US); Arijit Choudhury, Seattle, WA (US); Murtaza Doctor, Fremont, CA (US); Sudhir Konduru, Sunnyvale, CA (US); Timothy Matthew Lewis, San Mateo, WA (US); Abhijeet More, Seattle, WA (US); Hina Naseer, San Jose, CA (US); Ramanathan Padinjarel Somanathan, Fremont, CA (US); Karthikeyani Palanisami, Fremont, CA (US); Rashmi Krishnaiah Setty, Sunnyvale, CA (US); Sanjay Shanthakumar, Milpitas, CA (US); Ray Manpreet Singh Matharu, Sunnyvale, CA (US); Douglas Brian Terry, San Carlos, CA (US)

(73) Assignee: Amazon Technologies, Inc., Seattle, WA (US)

(*) Notice: Subject to any disclaimer, the term of this patent is extended or adjusted under 35 U.S.C. 154(b) by 193 days.

(21) Appl. No.: 15/971,994

(22) Filed: May 4, 2018

(65) Prior Publication Data
US 2019/0155937 A1 May 23, 2019

Related U.S. Application Data

(60) Provisional application No. 62/590,219, filed on Nov. 22, 2017.

(51) Int. Cl.
*G06F 16/27* (2019.01)
*G06F 16/23* (2019.01)

(52) U.S. Cl.
CPC .......... *G06F 16/27* (2019.01); *G06F 16/2365* (2019.01); *G06F 16/273* (2019.01)

(58) Field of Classification Search
CPC ........ G06F 16/27; G06F 17/30; G06F 16/273; G06F 16/2365

(Continued)

(56) References Cited

U.S. PATENT DOCUMENTS 6,163,855 A 12/2000 Shrivastava et al.
8,719,225 B1* 5/2014 Rath ...................... G06F 16/273
707/634

(Continued)

OTHER PUBLICATIONS

International Search Report and Written Opinion from PCT/US2018/061724, (Amazon Technologies, Inc.), dated Mar. 19, 2019, pp. 1-12.

*Primary Examiner* — Giovanna B Colan
(74) *Attorney, Agent, or Firm* — Robert C. Kowert; Kowert, Hood, Munyon, Rankin & Goetzel, P.C.

(57) ABSTRACT

A geographically distributed system using a hybrid, multi-master design is disclosed. The system may use global tables, for which both reads and writes may be performed locally, but with a single region serving as a master region. All strongly consistent reads and writes may be sent to the master region, whereas eventually consistent reads and writes may be performed in any region with a replica. The master region may not be statically assigned but may move from region to region. The master region may be assigned manually by client preference or may be assigned and updated automatically based on the time of day or workload characteristics.

20 Claims, 7 Drawing Sheets

(58) Field of Classification Search
USPC .................................................. 707/623, 614
See application file for complete search history.

(56) References Cited

U.S. PATENT DOCUMENTS

| | | | | |
|---|---|---|---|---|
| 8,843,441 B1* | 9/2014 | Rath | ..................... | G06F 16/273 707/614 |
| 8,930,312 B1* | 1/2015 | Rath | ..................... | G06F 16/278 707/634 |
| 9,053,165 B2* | 6/2015 | van Rossum | ........... | G06F 11/00 |
| 9,230,000 B1* | 1/2016 | Hsieh | .................. | G06F 16/2343 |
| 9,411,873 B2* | 8/2016 | Rath | ..................... | G06F 16/278 |
| 9,460,126 B1* | 10/2016 | Engers | ..................... | G06F 16/27 |
| 9,471,660 B2* | 10/2016 | Namburi | ............... | G06F 16/278 |
| 9,501,483 B2* | 11/2016 | Srivas | .................. | G06F 16/116 |
| 9,521,196 B2* | 12/2016 | Aahlad | .................. | G06F 9/466 |
| 9,632,878 B1* | 4/2017 | Maccanti | ............ | G06F 11/1469 |
| 9,646,024 B2* | 5/2017 | Srivas | .................. | H04L 65/102 |
| 9,727,590 B2* | 8/2017 | Gajic | ..................... | G06F 16/21 |
| 9,767,178 B2* | 9/2017 | Srivastava | .............. | G06F 16/27 |
| 9,830,372 B2* | 11/2017 | Rajamani | ............ | G06F 16/2358 |
| 9,846,528 B2* | 12/2017 | Eccleston | ............. | G06F 40/166 |
| 10,055,424 B2* | 8/2018 | Mortensen | .......... | G06F 16/2365 |
| 10,152,500 B2* | 12/2018 | Chan | ....................... | G06F 16/22 |
| 10,216,813 B2* | 2/2019 | Davis | .................. | G06F 16/2282 |
| 10,248,523 B1* | 4/2019 | Dalal | .................... | G06F 3/0631 |
| 10,382,502 B2* | 8/2019 | Pai | ........................ | G06F 40/169 |
| 10,606,829 B1* | 3/2020 | Chickanosky | ...... | G06F 16/2365 |
| 2012/0011398 A1* | 1/2012 | Eckhardt | ............ | G06F 11/2028 714/15 |
| 2012/0166390 A1* | 6/2012 | Merriman | ........... | G06F 16/2365 707/613 |
| 2013/0290249 A1* | 10/2013 | Merriman | ............. | G06F 16/278 707/610 |
| 2015/0278244 A1* | 10/2015 | Shvachko | ............. | G06F 16/182 707/634 |
| 2016/0085829 A1* | 3/2016 | Jin | ......................... | G06F 16/27 707/718 |
| 2018/0337987 A1* | 11/2018 | Jain | ..................... | H04L 67/1097 |

* cited by examiner

MULTI-REGION, MULTI-MASTER REPLICATION OF DATABASE TABLES

RELATED APPLICATIONS

This application claims benefit of priority to U.S. Provisional Application Ser. No. 62/590,219, entitled "MULTI-REGION, MULTI-MASTER REPLICATION OF DATABASE TABLES," filed Nov. 22, 2017, and which is incorporated herein by reference in its entirety.

BACKGROUND

Commoditization of computer hardware and software components has led to the rise of service providers that provide computation and storage capacity as a service. At least some of these services are difficult to scale, yet throughput and availability demands lead these services to be distributed on a geographical scale where data is replicated asynchronously among different geographical regions. In these designs, data is not synchronously maintained between replicas but is, rather, brought into consistency, or converged, over time through a background replication process. This eventual convergence may give rise to important data consistency considerations. A given data access request may be said to have a strong consistency type if the data the request accesses is guaranteed to be consistent with updates made to the data stored in the service, whereas a given data access request may be said to accept an eventual consistency type if the data the request accesses is not necessarily guaranteed to be consistent with updates made to the data (e.g., one or more recent updates may not yet be applied to the data). Techniques that allow a distributed service to offer different consistency types for accessing while implemented at a scale that satisfies throughput and availability demands are thus highly desirable.

Figure 1:
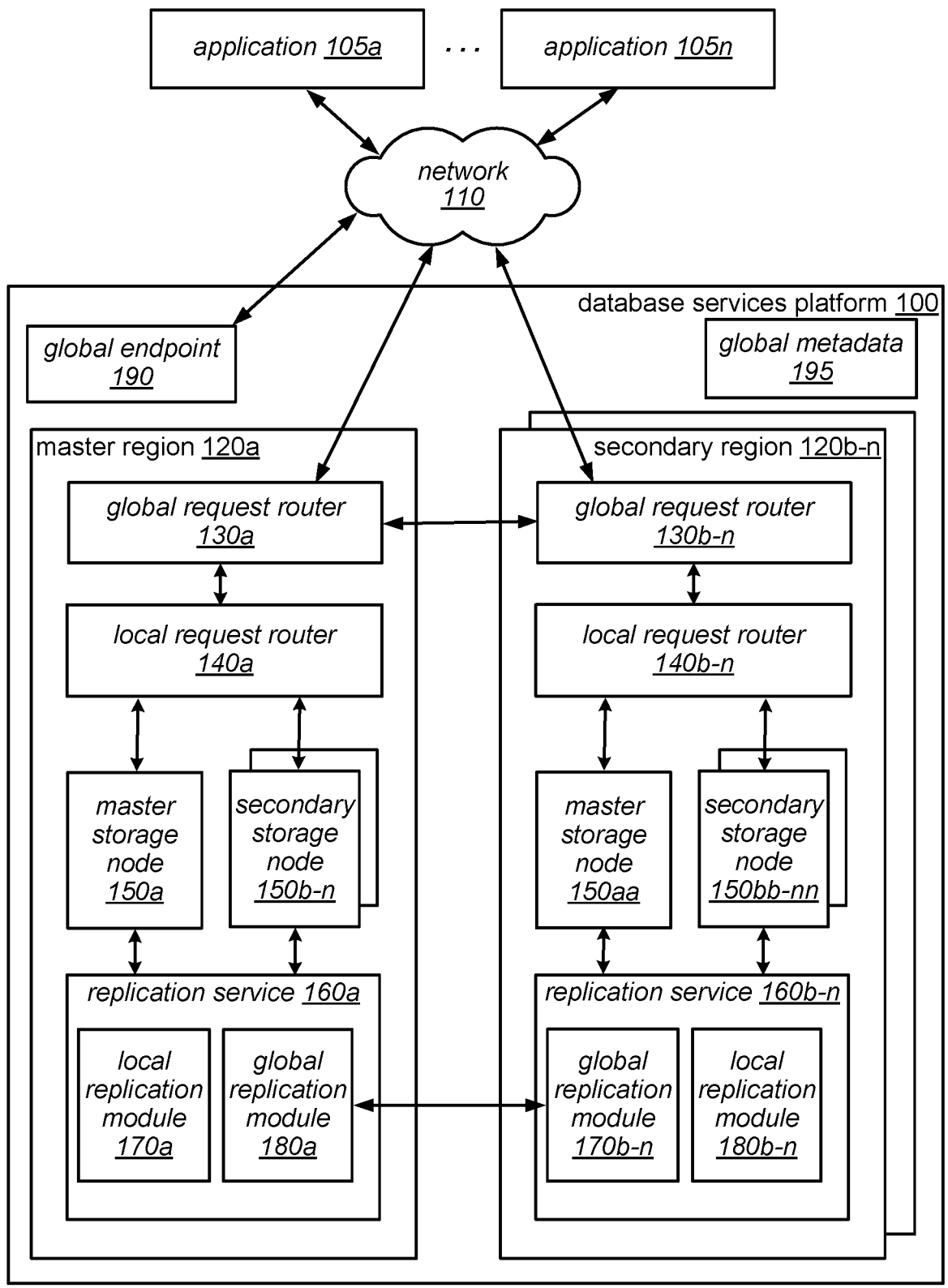
FIG. 1 is a block diagram a system architecture that implements a web services-based data storage service that provides multi-master, multi-region replication of database tables, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of a geographically distributed system using a hybrid, multi-master design are disclosed. The geographically distributed system may implement global tables with regional replicas, for which both reads and writes may be performed locally, but with a single region serving as a master region, in some embodiments. As regional replicas can update asynchronously, updates made in one region propagate to other regions over time, leading to eventual consistency of the global table's replicas, in some embodiments. The master region may perform all strongly consistent types of reads and writes, whereas eventually consistent reads and writes may be performed in any region with a replica, in some embodiments. In some embodiments, the master region is not statically assigned but is allowed to move from region to region and may be assigned manually by client preference or automatically based on time of day or on workload characteristics.

By implementing a hybrid, multi-master for database tables, a geographically distributed system can avoid performance bottlenecks while still supporting writes with different consistency types, in some embodiments. Applications can then take advantage of the different supported consistency types. In some embodiments, for example, different consistency types may supported in different regions (e.g., a master region may support a strong consistency type), allowing for requests from applications that utilize a given consistency type to be routed to the supportive region (e.g., allowing a request with a strong consistency type to be routed to the master region to be performed).

In various embodiments, a data storage service may be implemented on a one or more computing nodes can perform the functionality described herein. In some embodiments, the service may be implemented as a database services platform, such as database services platform 100 of FIG. 1, made up of multiple regions 120, including a master region 120a and one or more secondary regions 120b-n, each of which may perform one or more of the functions described herein. Various collections of computing nodes within a region 120 may implement provide a global request router 130, a local request router 140, replication service 160, and storage nodes 150, in some embodiments. In addition, the database services platform 100 may include a global endpoint 190 and global metadata 195, in some embodiments The database services platform 120 may implement global tables which include replicas maintained at each of the regions 120, in some embodiments. In some embodiments, some of the regions 120 may not maintain regional replicas but may only provide global request routing for a global table. Applications 105 of the database service may connect to the database services platform 100 at any of the regions of the global table, in some embodiments. In one embodiment, applications 105 may explicitly use the appropriate endpoint for their local region and potentially a second endpoint for the master region if desiring strongly consistent operations. If a region becomes inaccessible, the applications may explicitly switch to an endpoint in a different region, in some embodiments. In another embodiment, the database system may transparently route requests to the most appropriate region based on proximity and the desired consistency. In yet another embodiment, the database system may provide global endpoint 190 for global tables. Using the global endpoint, the database services platform 100 will automatically connect applications to the most desirable region, thus an application accessing a global table through a global endpoint need not have knowledge of the regions in which that table is replicated. Moreover, applications may automatically failover if the currently connected region becomes unreachable such as due to regional outage, in some embodiments. Various embodiments of global endpoints may be envisioned. In one embodiment, a global endpoint may be contacted to obtain local endpoint information for subsequent communications while, in another embodiment, a global endpoint may serve as a relay for communications to an assigned region. In still another embodiment, a global endpoint may be a logical endpoint controlled dynamically by means of routing information. It should be understood, however, that other embodiments of global endpoints can be envisioned and that these example embodiments are not intended to be limiting.

A global request router (GRR) component 130 within each region 120 may route requests among regions in order to satisfy consistency types associated with the requests, in some embodiments. Requests associated with or otherwise using a strong consistency type, for example, including both read and write requests, may be routed to the master region 120a while requests able to accept eventual consistency may be routed to a secondary region or forwarded on to the local request router 140 of the region where the request was received, in some embodiments. Should a request able to accept eventual consistency be received at a GRR associated with the master region, in some embodiments the request may be forwarded on to the local request router 140 of the master region while in other embodiments it may be forwarded, instead, to a secondary region. Please note that the previously discussed consistency types are examples of consistency types. Other consistency types may be implemented in some embodiments.

In some embodiments, the GRR may use various information contained with the requests to determine proper routing. Examples of such information may include identification of the client submitting the request, type of consistency for the request, particular performance criteria for the request, or the type of data being accessed by the request such as described further in FIG. 5A, 5B and FIG. 6. It should be understood, however, that these examples are not intended to be limiting.

Consistency types may be associated with a number of ways. In one embodiment, a consistency type may be specified using a field contained with the request itself, while in another embodiment a consistency type may be associated with the application submitting the request or with the client of database service. It should be understood, however, that other embodiments associating consistency types with requests can be envisioned and that these example embodiments are not intended to be limiting.

The individual regions 120 may implement a variety of database architectures, in some embodiments. In one embodiment, the regions 120 may implement a plurality of storage nodes 150, each containing replicas of the global table which are maintained asynchronously with the other replicas of the region. A single master storage node 150a may maintain an authoritative replica for the regions and performs all writes for the regions as well as reads requiring strong consistency guarantees. Replication between the storage nodes 150 may be performed by a local replication module 170 of the replication service 160 and requests may be routed to the storage nodes 150 by a local request router 140 based, in part, on request type and associated consistency types, in some embodiments. In some embodiments, the local request router 140 may also use various information contained with the requests to determine proper routing, such as the type of data being accessed by the request as described further in FIG. 5A, 5B and FIG. 6. While the example embodiment uses asynchronous replication and a single master storage node, it should be understood that other architectural embodiments for the individual regions can be envisioned and that these example embodiments are not intended to be limiting. Furthermore, it should also be understood that different regions can implement different architectural embodiments.

For each global table, configuration information may be stored in the global metadata 195 as shown in FIG. 1. Two types of information may be maintained for a global table: the set of regions in which the table is replicated and the designated master region for the table, in some embodiments. In one embodiment, the global metadata 195 is, itself, a global table that is replicated in all regions. This way, the metadata remains highly available and is accessible for reading with low latency. In this embodiment, the global metadata table may be mastered in one region. Updates to global metadata may be performed infrequently as strongly consistent writes, meaning that all updates may be first applied in the master region, in some embodiments.

Figure 4:
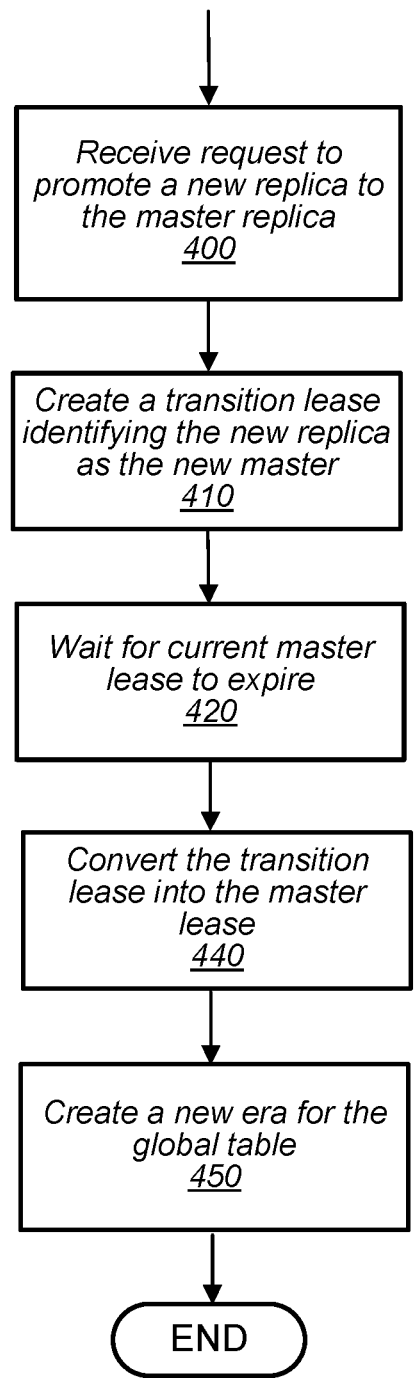
FIG. 4 is a flow diagram illustrating the processing of a request to promote a replica to the master replica, according to some embodiments.

Replication performed in the replication service 160 can tolerate out-of-date metadata about the set of replicas for a global table, in some embodiments. These functions can, therefore, read metadata using eventually consistent reads and cache the metadata, refreshing the cached metadata only when they discover that metadata is missing or has possibly changed. These functions, however, require up-to-date information about a global table's master region, in some embodiments. Because it is impractical for a GRR to read from the global metadata table for each strongly consistent request they receive, master leases may be used in some embodiments, as shown in FIG. 4.

Because authoritative global metadata 195, when implemented in a global table, resides in a single master region, this metadata may be vulnerable to regional outage, in some embodiments. To guarantee that metadata updates, including creating global tables and renewing master leases, can always be performed, eventually consistent writes may be used when the global metadata master region is unavailable, in some embodiments. Such writes can update the metadata in any region with the results propagated to all other regions through replication, in some embodiments. Applications accessing the metadata with eventually consistent reads will be unaffected, in some embodiments.

Eventually consistent metadata updates can lead to a possibility where some components can access the metadata master region while others cannot, in some embodiments. In this case, each component may settle on different masters for the same table. The consequence is that applications may issue strongly consistent writes to two different regions, and strongly consistent reads may not see strongly consistent writes in another region, in some embodiments. This does not violate convergence as replicas will eventually reach a mutually consistent state once the network partition heals, in some embodiments. It may, however, temporarily violate strong consistency guarantees.

A lease mechanism can ensure that no more than one master exists for each global table at any point in time and allows mastership information to be cached effectively, in some embodiments. Each master lease may have an expiration time, in some embodiments. When the master lease expires, it can be renewed by the same region or acquired by a new region that takes over as the master, in some embodiments. The mastership of a global table may be guaranteed to not change before the current master lease expires, even if the master region fails and a forced switchover is requested, in some embodiments.

GRRs and replication services can cache mastership information until the expiration time (or shortly before that accounting for clock asynchrony), in some embodiments. A GRR can either flush its cache when a master lease expires or proactively refresh its cache before the lease expires, in some embodiments. Longer leases may be refreshed less frequently, thereby increasing scalability, but also delay master region changes, in some embodiments. Reading the master lease metadata with eventual consistency may be performed because expiration times are explicit, and may be beneficial as long as the lease duration is longer than the cross-region replication lag, in some embodiments.

Nodes that cache and use mastership information cannot be assumed to have tightly synchronized clocks, in some embodiments. Thus, they may not agree on whether a master lease has expired, potentially leading to incorrect behavior, in some embodiments. An upper bound on clock divergence may be assumed and leases treated conservatively. This bound can be fairly high if lease durations are long, in some embodiments. For example, using a clock bound of one second, lease durations of five minutes may be reasonable, in some embodiments. Clients caching mastership information may act as though the lease expires one second early according to their local clocks, in some embodiments. Regions wishing to acquire mastership may act as though the current lease expires one second late according to their clocks, in some embodiments.

Figure 2:
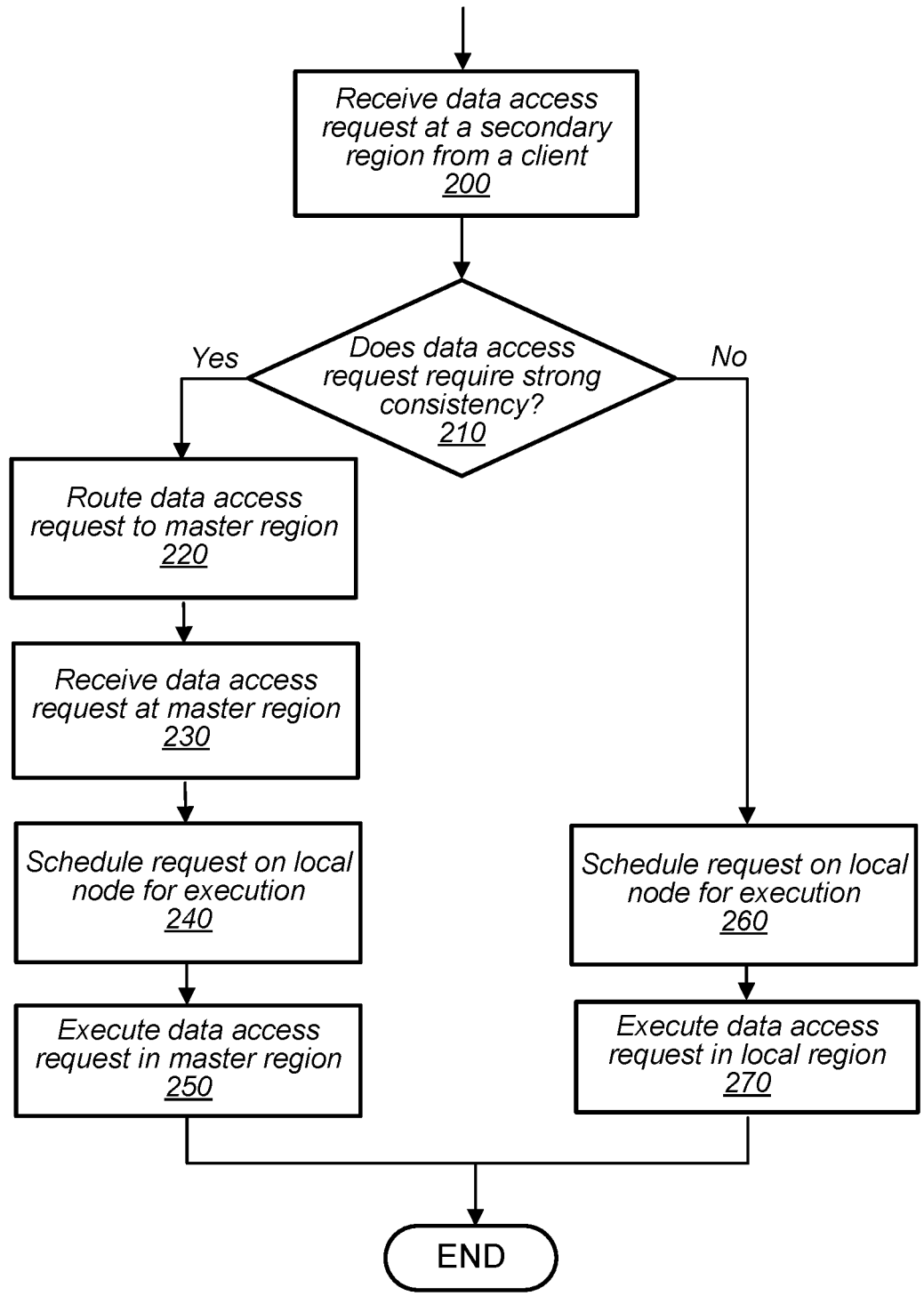
FIG. 2 is a flow diagram illustrating the processing of a data access request according to a type of data consistency for the data access request, according to some embodiments.

FIG. 2 illustrates the processing of a data access request at a secondary region according to a required type of data consistency according to some embodiments. Examples of data access requests may include read requests and write requests, in some embodiments. When an application submits a data access request to a global table, the GRR will route requests between regions as needed, in some embodiments. A request to access data in a global table is first received at a secondary region from a client 200 at a GRR. The GRR looks up metadata for the global table to determine the set of regions in which it is replicated and the current master region, in some embodiments.

Reads and writes with a strong consistency type may be routed to a different region even if a local replica exists, in some embodiments. If the request is a strongly consistent read or write, then the GRR routes the request to the master region 220 if the local region is not the master region, in some embodiments. Once the request is received at the master region 230, the request is scheduled for execution 240 on the storage node of the region that can provides a strong consistency guarantee in accordance with the strong consistency type, in some embodiments. The request may then be executed in step 250 and one or more update records added, if necessary, to the update stream of the master region to facilitate replication, in some embodiments.

If the request is a read or write associated with an eventual consistency type, then more cases may be considered, in some embodiments. In the simplest case where the local region contains a replica of the table, the GRR forwards the request to the request dispatcher 210 in its same region, in some embodiments. The request dispatcher 210 then routes the request in the usual manner, in some embodiments. If no local replica exists, then the GRR selects a region that contains a replica and then sends the request to that region, in some embodiments. Although any region could be selected, the closest region may be selected, rather than a random region, to provide the lowest latency, in some embodiments. Once the request is received at the destination region, the request is scheduled for execution 260 on the local replica according to the architecture of the local region, in some embodiments. The request is then executed in step 270 and one or more update records added, if necessary, to the update stream of the local region to facilitate replication, in some embodiments.

Figure 3:
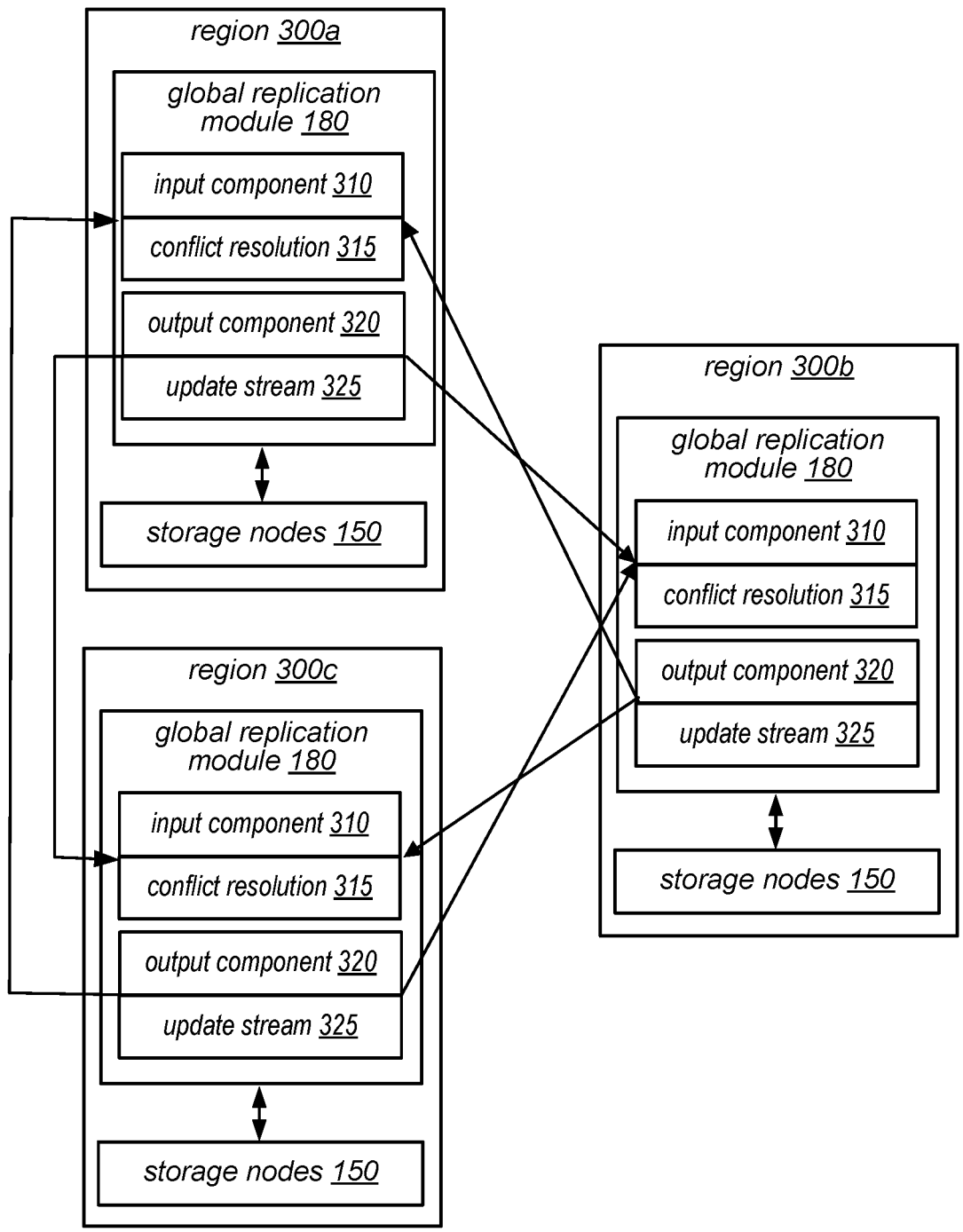
FIG. 3 is a block diagram illustrating various components of a replication engine, according to some embodiments.

FIG. 3 is a block diagram illustrating one embodiment of a replication service suitable for implementing some or all of the replication techniques described herein. For simplicity, FIG. 3 shows three regions 300*a*-300*c*. While three nodes are shown, it should be understood that the replication system is not intended to be limited in this way but that embodiments may include only two regions or may include a greater number of nodes than the three regions shown in FIG. 3. Update streams 325 are maintained for each regional replica of a global table, in some embodiments.

The update stream 325 for a region contains one or more update records for each write request that is initiated in that region, in some embodiments. The global replication module 180 of a region only includes writes performed on behalf of applications in the update stream 325 and excludes writes from the update stream 325 that are performed by the replication process itself, in some embodiments. Although writes requests can be complex, often including conditional update operations, increment operations and updates to specific attributes, update records included in the update stream 325 are, in contrast, simple, in some embodiments. For each successful application-initiated write, an update record includes a complete new version of data produced by the write. Propagating whole item versions between regions, rather than the write requests themselves, ensures that replication is deterministic and will result in convergence, in some embodiments. Specifically, if a conditional write succeeds in a local region, then the version of data produced will eventually be written in all other regions (unless superseded by an unrelated update via a conflict resolution process involving conflict resolution components 315 described below), in some embodiments.

Individual update records of the update streams 325 are pushed to the input components 310 of other regions 120 by the output components 320, in some embodiments. Because the replication system independently pushes updates, versions of a given data item may arrive at a replica out of order, in some embodiments. For example, suppose that region 300a updates an original version of an item producing a first new version, then region 300b receives the first new version of the item from region 300a and updates the item producing a second new version, in some embodiments. The third region 300c will then receive both the first new version of the item from region 300a and the second new version of the item from region 300b, in some embodiments. The order of arrival of these two pushed updates at the input component 310 of region 300c, however, is indeterminate, as communications latencies between the regions may vary. Thus, for each write request, the region 120 adds an update timestamp as system attribute on the item. In some embodiments, this update timestamp may be added during the performance or the write request while in other embodiments the update timestamp may be added by the global replication module 180, in some embodiments. This update timestamp is propagated with the item in the update record, in some embodiments. Timestamps may determine the latest version of an item, even if those versions are received out of order during replication, in some embodiments. When a region receives a new version during replication, it checks the timestamp of the version that it already stores, in some embodiments. If the stored version has an older timestamp, then the new version is written to replace it; otherwise, the newly received version is ignored, in some embodiments. All replicas may agree on the latest version independent of the order in which versions are received, in some embodiments.

Strongly consistent writes, since they may be performed in the master region, are strictly ordered and may not conflict, in some embodiments. Thus, applications that only issue strongly consistent writes need not worry about write conflicts, in some embodiments. Eventually consistent writes, however, can result in conflicting updates, most notably when the same item is assigned different values by different writers in different regions or is deleted in one region while being updated in another. An eventually consistent write can conflict with other such writes or with strongly consistent writes, in some embodiments.

All update conflicts may be automatically detected and resolved during the replication process by conflict resolution component 315. One of the conflicting versions of an item is chosen to remain in the global table; other conflicting versions are discarded, in some embodiments. If a delete operation is chosen as the winner, then the item is deleted in all replicas, in some embodiments.

In one embodiment, conflicts may not be detected. Timestamp system attributes are used for ordering both sequential and conflicting versions of an item and conflicts are quietly and deterministically resolved according to a last-writer-wins policy, in some embodiments.

In another embodiment, conflicts may be detected and resolved so that metrics can be reported about conflicting updates and losing versions can be logged. Detecting concurrent updates to the same item is easily done using version vectors, in some embodiments. Every item may have an attached version vector that is stored as another system attribute, in some embodiments. The version vector conceptually contains an entry for each region in which the global table is replicated, though zero-valued entries need not be explicitly stored, in some embodiments. Semantically, the version vector counts the number of times that an item has been updated in each region, in some embodiments. When an item is initially created, its version vector is all zeros except for the region in which the item was created, in some embodiments. When an application updates an item in a region (but not when the updated item is propagated by the replication process), the region's component of the item's version vector is incremented, in some embodiments. Two versions of an item are determined to be in conflict if neither version vector dominates the other, in some embodiments.

When resolving conflicts, a winner may be chosen using a strong-then-latest-writer-wins policy, in some embodiments. For example, item versions produced by strongly consistent writes may take precedence over those from eventually consistent writes, in some embodiments. For conflicts involving two eventually consistent operations, a version that was written last (as determined by generated timestamps) may be chosen as the winner, in some embodiments. Such a rule guarantees that all regions will resolve conflicts in a deterministic manner, even for an arbitrary set of conflicting writes, in some embodiments. Applications may choose different conflict resolution policies or be informed of losing versions that the database system discards, in some embodiments. An application-specific resolution function can take arbitrary actions, such as (a) resubmitting the losing version, thereby overwriting the winner, (b) ignoring the losing version, thereby accepting the choice of winner, (c) writing the losing version with a different key or to a different table, thereby saving both conflicting versions, or (d) merging the winning and losing versions into a new item that is written back to the global table, in some embodiments.

The replication protocol may associate metadata with each item: update timestamps to consistently order versions of an item, version vectors to detect conflicting updates to the item, and birthstamps to differentiate different incarnations of items with the same primary key, in some embodiments. This information may be stored as attributes along with the item itself, in some embodiments. Such attributes may not be visible to applications that are reading items from a global table but may be accessible to replication engines and to GRRs, in some embodiments. In one embodiment, the replication engine may store per-item metadata as ordinary item attributes, in some embodiments. These may be given attribute names that do not conflict with those used by the applications. Applications can read such attributes but may not delete or modify them, in some embodiments.

Update timestamps may monotonically increase even though nodes have clocks that are not completely synchronized, in some embodiments. As an example of a problem that may be avoided, consider the scenario where an item is updated in region 300a, then read in region 300b, and then updated in region 300b, in some embodiments. Given that the clocks in region 300a and 300b are not synchronized, an update timestamp generated in region 300b could be less than the one generated in region 300*a* for the first update, in some embodiments. This would cause region 300*b*'s update to be lost although there was no conflict, in some embodiments.

In one embodiment, the master region for an item may generate an update timestamp from its local clock. If its local time is before the item's previous timestamp, then the master region may increment the previous timestamp rather than using its own clock, in some embodiments. In another embodiment, the replication output component 320 may add timestamp attributes to items that it reads from the update stream 325 and ensures that the new timestamp is greater than that of the pre-image in the stream record. In yet another embodiment, GRRs, upon receiving a write request, may generate an update timestamp and add it as a system attribute as the item is being written. These added timestamp attributes will be stripped out by GRRs for items that are returned by read operations. In order to ensure that such timestamps are increasing, the GRR needs to read the item before generating the timestamp to avoid adding latency to each write request, in some embodiments.

Delete operations also add records to an update stream, in some embodiments. Once an item is deleted, no timestamp remains that could be used to order the deleted version relative to other updates that may still be in transit, in some embodiments. As a simple example, suppose that region 300*a* creates a new item, and then region 300*b*, after receiving this item, deletes it. When region 300*a* receives the delete record from region 300*b*, it will also delete the item and the two regions will be synchronized. Region 300*c*, however, will receive both the item from region 300*a* and a delete record from region 300*b*. If regional mode 300*c* receives the delete record first, it will ignore the delete record and subsequently create the item in its local replica, leaving it inconsistent with replicas in regions 300*a* and 300*b*. To avoid this problem, replicas may retain timestamped deletion tombstones in a local deletion registry, in some embodiments. When a delete record is received during replication, the tombstone is saved in the region's registry and then the item is deleted, in some embodiments. When an update record is received, if there is no currently stored version, then the registry is consulted to see if the item had been previously deleted, in some embodiments. If a tombstone is present, then the received version is ignored as being out-of-date. If no tombstone is found, then the received version is created in the table, in some embodiments. A tombstone can be removed from the registry once the replication engine is certain that the item has been deleted by all replicas and that no versions remain in any update streams, in some embodiments.

An additional issue is that a deleted item could be recreated with the same primary key, in some embodiments. In this case, ignoring the newly produced version may not appropriate. Instead, each create operation may attach a unique birthstamp as a system attribute on items that are created, in some embodiments. Different incarnations of an item with the same primary key may have different birthstamps, in some embodiments. A birthstamp could be a GUID or a simple timestamp. A delete operation deletes an item with a particular birthstamp, which is recorded in the generated tombstone, in some embodiments. The replication engine may ignore versions of items with birthstamps for which a tombstone exists, in some embodiments.

FIG. 4 illustrates the processing of a request to promote a region to the master region according to some embodiments. In some embodiments, a request to promote a region may be received due to client request, for example because the current master has become unavailable, while in other embodiments the request may be received based on time of day or based on workload. When a request is received to promote a new replica to master 400, a transition lease is first created in the metadata table 410, in some embodiments. For example, the name of the region that is taking over may be written along with the expiration time for this next lease, in some embodiments. The new master's lease may run from the time that the current lease expires until the time that the next lease expires, in some embodiments. When the existing master lease expires 420, the transition lease may become the new master lease 440 and the new mastership begins, in some embodiments A new era is created 450 when the new mastership starts, and strongly consistent reads in the previous era may not be guaranteed, in some embodiments.

A transition lease can communicate transition information to different components of a distributed system. For example, a current master's attempt to renew its lease using a conditional write may fail, thereby informing the current master of an upcoming transition. In another example, request routers, upon refreshing their caches with lease information, may discover that a mastership change is in progress.

A GRR may stop routing strongly consistent reads and writes to the current master when it determines that the lease may have expired and it will start using the new master after waiting a small period to ensure that the new master has taken over, in some embodiments. The period of time between when the old mastership expires and the new mastership takes effect may be based on the bound on clock asynchrony, in some embodiments. During this period, strongly consistent reads and writes may be rejected, in some embodiments. This ensures that all reads and writes in the previous era are completed before any reads and writes are accepted in the new era, in some embodiments.

A region may become unavailable, in some embodiments. Eventual replica convergence is guaranteed regardless of temporary failures since the cross-region replication process will queue items that cannot be replicated to a region and send those items when the region recovers, in some embodiments. Similarly, items that were written in a region, but not replicated before the region failed, are propagated to other regions after the failed region recovers, in some embodiments.

If a non-master region becomes unavailable, strongly consistent reads and writes, as well as eventually consistent reads and writes to other regions, may be unaffected, in some embodiments. If a customer is using an endpoint for the failed region to issue eventually consistent operations, then that customer can manually switch to another region's endpoint (or can wait until the region recovers), in some embodiments.

If the master region for a global table fails, the client may manually change the master to a new region, in some embodiments. To ensure a clean transition, the new master may wait for some period before assuming its responsibility, in some embodiments. During the transition period in which the previous master is unavailable and the switch to the new master has not yet happened, strongly consistent reads and writes may fail, in some embodiments.

When a switchover to a new master is performed, a new era is created, in some embodiments. Strongly consistent reads and writes may be accepted by the new master in the new era, in some embodiments. However, strongly consistent reads may not be guaranteed to observe writes in the previous era, only strongly consistent writes in the current era, in some embodiments.

Writes in the previous era may not be lost (unless the region experiences multiple unrecoverable drive failures), and they may be replicated when the region recovers, in some embodiments. Such writes may conflict with writes in the current era, in some embodiments. Writes in the current era may be chosen as the winner in case of conflicts, in some embodiments The system's underlying the data storage service described herein may store data on behalf of storage service clients (e.g., client applications, users, and/or subscribers) in tables containing items that have one or more attributes. In some embodiments, the data storage service may present clients with a data model in which each table maintained on behalf of a client contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique.

Various types may be employed in the data storage system to support the ordering of data in sorted indexes. In some embodiments, the data storage service may support only a small number of types (e.g., strings and decimal numbers), and all attribute values may have either a scalar or set (multiple value) type. For example, in some embodiments, the service (and/or the underlying system implementing the service) may only support two scalar data types: strings, and numbers (e.g., decimal numbers). In such embodiments, a date may be encoded as an integer (e.g., as a Unix epoch timestamp) rather than using a "date" data type. In other embodiments, more, fewer, or different data types may be supported. As noted above, in some embodiments, attribute names may always be of data type "string". In some embodiments, the service (and/or the underlying system) may support multi-valued types that are derived from the supported scalar types, as in the following example:

ScalarType:={N|S}
MultiValuedType:={NS|SS}

In this example, N represents a number, S represents a string, NS represents a set of numbers, and SS represents a set of strings. In various embodiments, attributes of type "string" may be part of a key or part of an index, and the maximum size of a string may be limited by the size of an index key (e.g., 1024 bytes cumulative for a range key or 2048 bytes for each hash key) or the item size (e.g., 64 K). In various embodiments, attributes of type "number" may be used to store exact-value decimal and integers, and may have variable width encoding. In some embodiments, the amount of space that can be occupied by an attribute of this type may be limited to a pre-determined amount. Note also that in various embodiments, a number can have a precision P (indicating the maximum number of significant digits that can be stored), and/or a scale S (indicating the number of digits from the decimal point to the least significant digit). The precision and scale of a number may in some cases be automatically inferred by the service, and an appropriate storage size may be used for the number. Negative numbers may be specified using a minus sign at the beginning of the number, but a plus sign specified before a number may not be stored, in some embodiments. Leading and/or trailing zeros may or may not be stored, in different embodiments. The following is an example of a number format that may be employed by the service (and underlying system) described herein:

Number_format=[+/−][{integer}][{.Integer}]

As noted above, an item may include one or more attributes. Each attribute may have two portions: an attribute name (e.g., an UTF8 string) and an attribute value (which may be expressed as a combination of a type and a value object, where the type describes the type of the value). In some embodiments, a single-valued attribute may have a name and a scalar value, and the type of the attribute may be encoded in the attribute value, as in the following examples:

{"my-string-attr": {"S": "my-string-value"}} #String type
{"my-number-attr": {"N": 123456.7}} #Number type In some embodiments, a multi-valued attribute may have a name, and one or more values of a specified type. In such embodiments, the values may be unique, as in the following examples:

{"Size": {"SS": ["XL", "L", "M", "S"]} #String set
{"SingleDigitPrimes": {"NS": [2, 3, 5, 7]} #Number set In some embodiments, the systems described herein may employ a somewhat limited indexing and/or query model in order to provide massive (i.e. virtually unlimited) scaling, predictability, and simplicity for users/subscribers or client applications. For example, in some embodiments, data may be indexed and partitioned (e.g., partitioned in the underlying database) by a primary key only. In such embodiments, the primary key to be used for indexing data in a user table may be specified by the user at the time that the table is created on the user's behalf. Thereafter, the partitioning of the user's data may be handled by the system, and abstracted from the user. In some embodiments, the primary key used for indexing data may consist of a single attribute hash key. In other embodiments, the primary key used for indexing and/or partitioning data may be a composite key comprising a hash key component and another component, sometimes referred to herein as a range key component. As described in more detail herein, in various embodiments, queries may be supported against indexed attributes, and a full table scan function may be provided (e.g., to support troubleshooting). In some embodiments, users may define secondary indexes for a table based on one or more attributes other than those of the primary key, and then may query for items using the indexes they have defined. For example, in some embodiments the system may support the creation of creating secondary indexes on-the-fly (e.g., using a createIndex API), and these secondary indexes may scale automatically based on storage needs (e.g., increasing or decreasing data volume)

and/or read/write traffic. In some embodiments, such secondary indexes may be asynchronously updated as items in the table are updated.

As previously noted, in some embodiments there may be no pre-defined limit on the number of items in each table maintained by the data storage service. Conceptually, each item may be thought of as a mapping of attribute names to corresponding attribute values. Using this analogy, each entry in the map is an attribute. In various embodiments each item may include a key attribute, plus zero or more non-key attributes. In some embodiments, the key attributes may be single-valued attributes, while non-key attributes may be single-valued attributes or multi-valued attributes. The following is an example of an item that has five attributes: a PictureId (of type string), a CustomerId (of type number), a Title (of type string), and Tags (a multi-valued string attribute).

```
{
    "PictureId" : {"S" : "picture123"},
    "CustomerId" : {"N" : 1234567},
    "Title" : {"S" : "sun flower"},
    "Tags" : {"SS" : ["flower", "seattle"]}
}
```

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited.

Figure 5A:
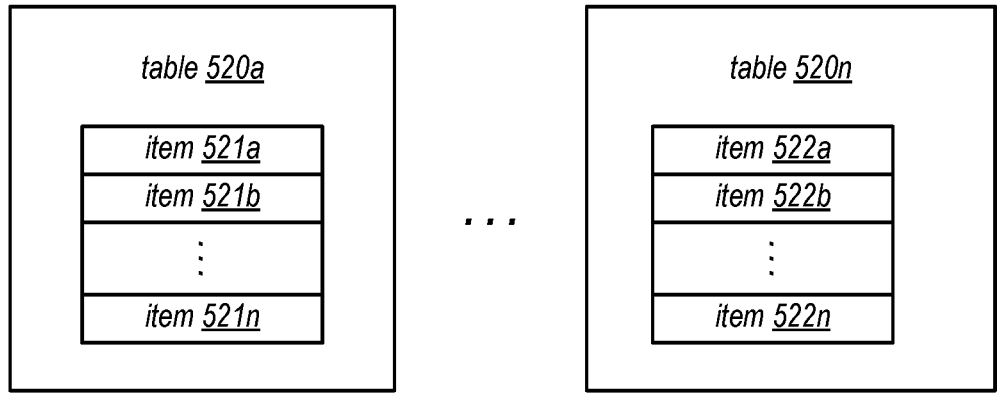
FIGS. 5A and 5B are block diagrams illustrating the storing of data as items in a plurality of tables, according to one embodiment.
Figure 5B:
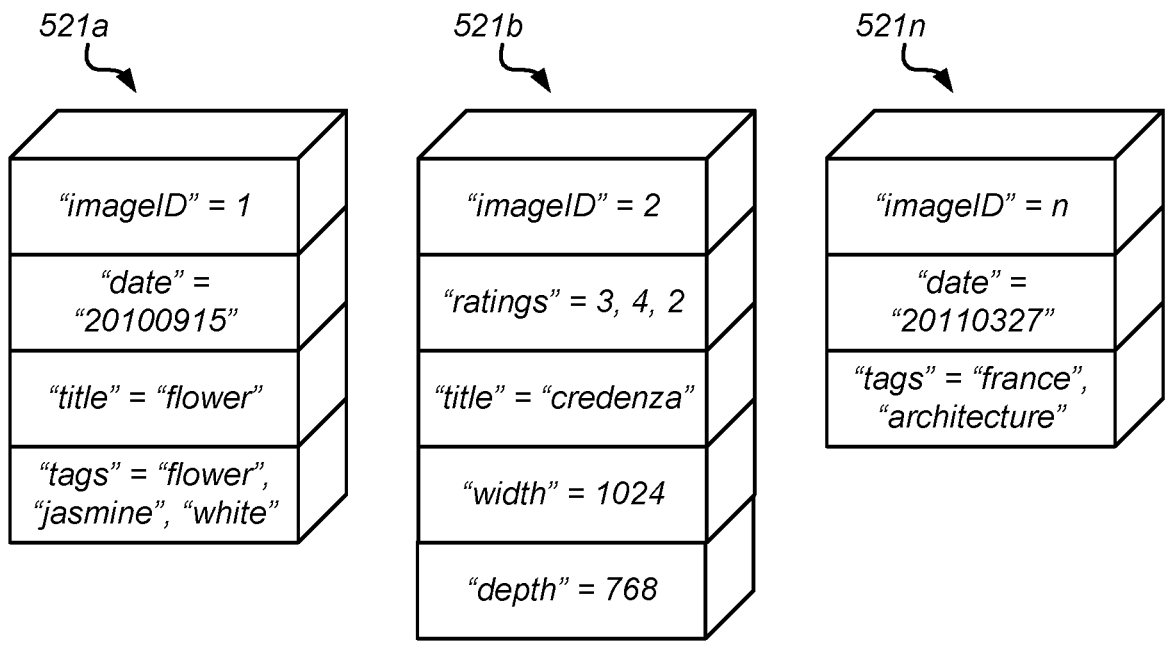

FIGS. 5A and 5B illustrate the storing of data in a plurality of tables, according to one embodiment. As illustrated in FIG. 5A and described above, each of a plurality of tables (shown as tables 520a-520n) may store a plurality of items. In the illustrated example, table 520a stores items 521a-521n, and table 520n stores items 522a-522n. As illustrated in FIG. 5B, each of the items stored in a table may include a plurality of attributes, and each of the attributes may include an attribute name and a scalar or set type value. In this example, item 521a (stored in table 620a) includes a numeric "imageID" attribute whose value is 1, a numeric "date" attribute whose value is 20100915, a sting attribute named "title" whose value is "flower", and a string attribute named "tags" whose value is the set containing the strings "flower", "jasmine", and "white". In this example, item 521b (which is also stored in table 520a) includes a numeric "imageID" attribute whose value is 2, a numeric attribute named "ratings" whose value is the set containing the numeric values 3, 4, and 2, a sting attribute named "title" whose value is "credenza", a numeric "width" attribute whose value is 1024, and a numeric "depth" attribute whose value is 768. In this example, item 521n (which is also stored in table 520a) includes a numeric "imageID" attribute whose value is n, a numeric "date" attribute whose value is 20110327, and a string attribute named "tags" whose value is the set containing the strings "france" and "architecture". Note that even though items 521a, 521b, and 521n are all stored in the same table (table 520a), they do not all include the same set of attributes. Instead, each item includes a sparse set of attributes from among all the attributes that have been specified for the collection of items stored in table 520a. In some embodiments, tables such as those described herein may be used to store and manage system metadata in addition to user data.

The sparsely populated items described above may be further illustrated by the grid representation in Table 1 below. Note that the grid format of Table 1 below is merely a convenient mechanism for illustrating the fact that various items in a single table may include different subsets of the item attributes included in the collection of items in the table. It is not meant to imply any particular structure for a table that is maintained in the non-relational database systems described herein, or for the items themselves. Therefore, the choice and arrangement of the rows and columns of Table 1 below may be considered to be arbitrary and for illustration purposes only. As described herein, the tables maintained by the systems described herein may not have fixed schemas. As such, items may not include placeholders (i.e. empty elements) for attributes that are not included therein, and attributes (and their values) may be added to one or more items without having to add them to all other items.

TABLE 1

Example of sparsely populated item attributes

| imageID | date | title | ratings | tags | width | depth |
|---------|------|-------|---------|------|-------|-------|
| 1 | 20100915 | flower | | flower, jasmine, white | | |
| 2 | | credenza | 3, 4, 2 | | 1024 | 768 |
| ... | | | | | | |
| n | 20110327 | | | France, architecture | | |

In some embodiments, a table maintained by the data storage service on behalf of a client may have a primary key that identifies its items. The primary key may be defined over one attribute (and may be single valued, as described above) or over several attributes (i.e. it may be a composite primary key, as described above), in various embodiments. The key attributes may be immutable, may have a fixed type, and may be mandatory for every item, as they uniquely identify an item within a table. In some embodiments, the primary key is the only part of the table that is indexed, and the index type may be specified when a table is created. For example, when a table of items is created, an attribute may be designated as the primary key attributes for the table (or two attributes may be designated for a composite primary key). All items in the table may include the attribute(s) designated for the primary key and the data storage service (and/or underlying system) may ensure that the value (or combination of values) for those attribute names is unique for each item in the table. For example, if an attempt is made to add a new item that has the same primary key value as an existing item, the new item may replace the existing item in the table.

Figure 6:
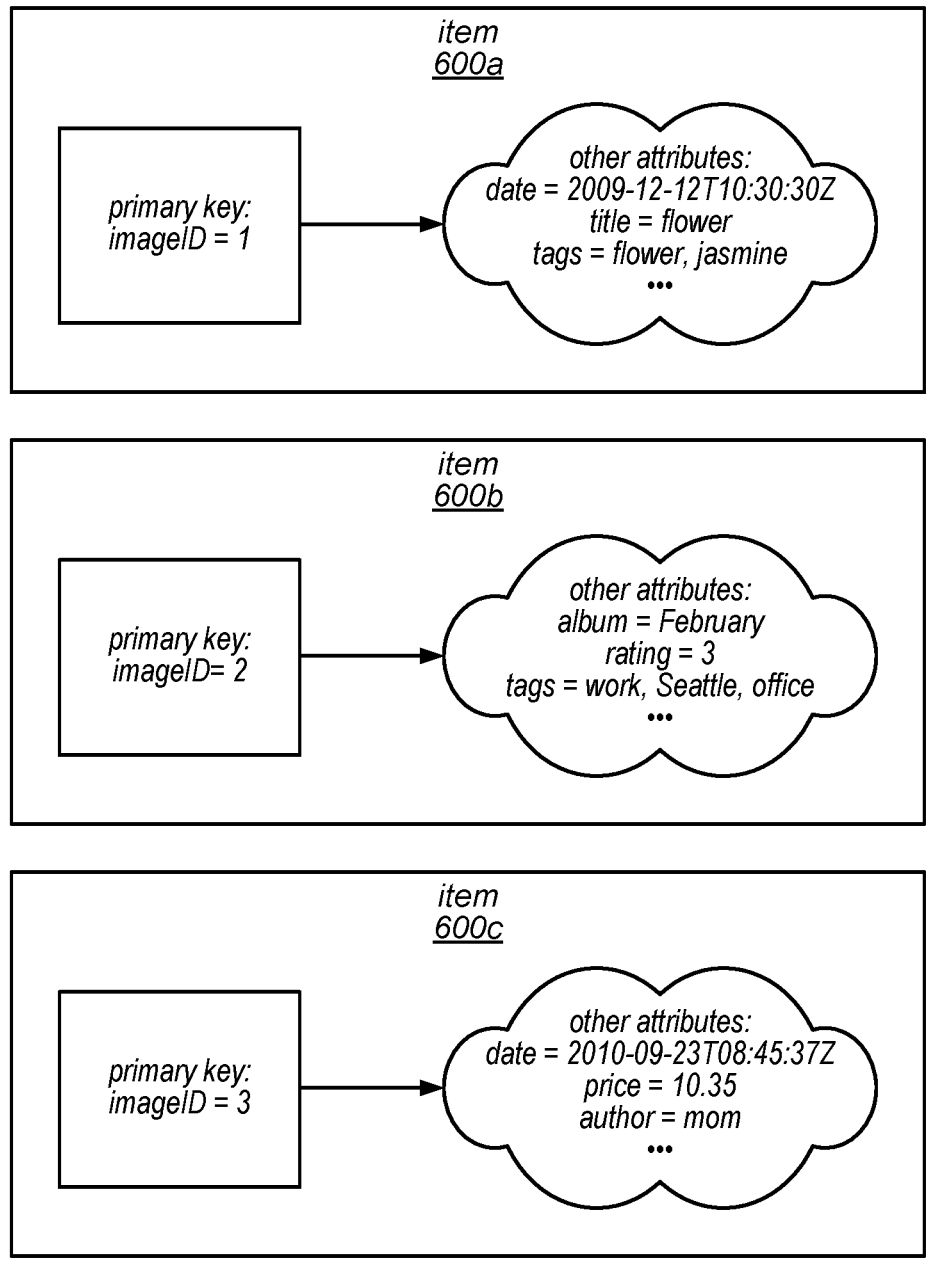
FIG. 6 is a block diagram illustrating three items that contain a numeric attribute that has been designated as the primary key for the table in which they are stored, according to one embodiment.

FIG. 6 illustrates three items that may be stored in a table for which a numeric attribute named "imageID" has been designated as the primary key, according to one embodiment. In this example, item 600a includes the imageID attribute (which has a value of 1), and values for at least three other attributes (e.g., a date attribute, a title attribute, and a tags attribute). Similarly, item 600b includes the imageID attribute (which has a value of 2), and values for at least three other attributes (e.g., an album attribute, a rating attribute, and a tags attribute). In this example, item 600c includes the imageID attribute (which has a value of 3), and values for at least three other attributes (e.g., a date attribute, a price attribute, and an author attribute). In this example, the items stored in the table may be indexed according to their primary key values. In other words, each of these items may be uniquely identified by its primary key value alone, and an operation to retrieve an item that has been identified by its primary key value may include retrieving the values of some or all of its other attributes.

As noted above, the data storage service (and/or the underlying system) may create an index based on the primary key. The type of index may be dependent on the whether the table uses a simple primary key or a composite primary key. For example, the data storage service may index the primary key either as a hash index or a hash-and-range index, as follows:

Hash—A may be can be a string or a number. Simple primary keys may have one index value: a hash index, which may be a string or a number.

Range—A range may be a string or a number. A range may allow table items to be sorted so that data queries can refine results based on the range. Composite primary keys may contain two values for the index: a hash index (sometimes referred to herein as the hash key value) and a range index (sometimes referred to herein as the range key value).

A simple primary key may be sufficient for data collection and infrequent scanning of table data (e.g., using the scan API described below). A composite primary key may allow table data to be organized more precisely, and may allow the use of the Query API described below for more efficient data retrieval. The following address table (Table 2) illustrates the use of a single attribute as the primary key to uniquely identify each item in the table.

TABLE 2 uses a simple primary key (string)

| Primary Key | Other Attributes |
| --- | --- |
| UserID = Jennifer | street = 100 Pine, city = Seattle, state = WA |
| UserID = Bob | street = 24 Freemont Ave, zip = 95112 |
| UserID = Harold | street = 20104 N. 4th St., suite = 35, city = Columbus, state = OH |

In this example, the primary key, an attribute called UserID, is required in every item and its type ("string") is fixed for every item. However, each item may also include any combination of additional attributes. The data storage system may in some embodiments ensure that the value of UserID is unique for each item in the table. As noted above, in some embodiments, attribute values cannot be null or empty. In such embodiments, an attribute does not exist in the table until/unless it has a value associated with it. The following table (Table 3) designates a numeric attribute (in this case, the ImageID) as the primary key by which items in the table may be uniquely identified:

TABLE 3 uses a simple primary key (number)

| Primary Key | Other Attributes |
| --- | --- |
| ImageID = 1 | ImageLocation = myBucket/img_1.jpg, Date = 2009-12-12T10:30:30Z Title = flower Tags = Flower, Jasmine Width = 1024 Depth = 768 |

TABLE 3-continued uses a simple primary key (number)

| Primary Key | Other Attributes |
| --- | --- |
| ImageID = 2 | ImageLocation = myBucket/img_2.jpg, Date = 2010-09-20T18:40:50Z Ratings = 3, 4, 2 Tags = Work, Seattle, Office Width = 1024 Depth = 768 |
| ImageID = 3 | ImageLocation = myBucket/img_3.jpg, Date = 2010-09-23T10:30:30Z Price = 10.25 Tags = Seattle, Grocery, Store Author = Bob Camera = phone |
| ImageID = 4 | ImageLocation = myBucket/img_4.jpg, Date = 2010-08-23T10:40:50Z Title = Hawaii Author = Joe Colors = orange, blue, yellow Tags = beach, blanket, ball |

In this example, the primary key, ImageID, is required in every item and its type ("number") is fixed for every item, but each item may include any combination of other attributes. As in the previous example, the data storage system may in some embodiments may ensure that the value of ImageID is unique for each item in the table. As noted above, in some embodiments, attribute values cannot be null or empty. In such embodiments, an attribute does not exist in the table until/unless it has a value associated with it.

Figure 7:
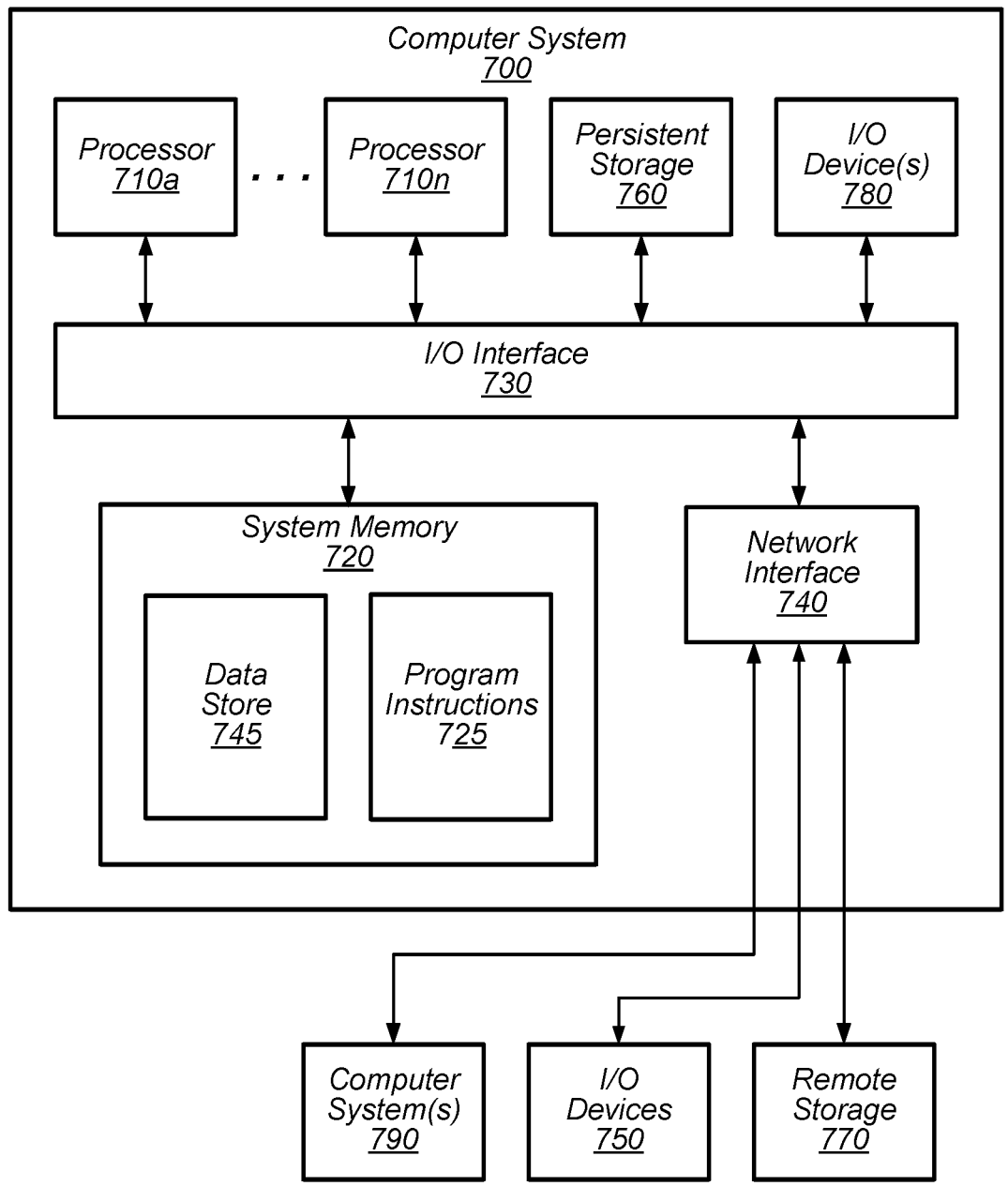
FIG. 7 is a block diagram illustrating an example computer system, according to various embodiments.

Any of various computer systems may be configured to implement processes associated with a technique for multi-region, multi-master database replication as discussed with regard to the various figures above. FIG. 7 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various of the illustrated embodiments may include one or more computer systems 700 such as that illustrated in FIG. 7 or one or more components of the computer system 700 that function in a same or similar way as described for the computer system 800.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable applications, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 720 may store instructions and data accessible by processor 710. In various embodiments, system memory 720 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or provider network are shown stored within system memory 720 as program instructions 725. In some embodiments, system memory 720 may include data store 745 which may be configured as described herein.

In one embodiment, I/O interface 730 may coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may allow data to be exchanged between computer system 700 and other devices attached to a network, such as between a client device and other computer systems, or among hosts, for example. In particular, network interface 740 may allow communication between computer system 800 and/or various other device 760 (e.g., I/O devices). Other devices 760 may include scanning devices, display devices, input devices and/or other communication devices, as described herein. Network interface 740 may commonly support one or more wireless networking protocols (e.g., Wi-Fi/IEEE 802.7, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 700, including one or more processors 710 and various other devices (though in some embodiments, a computer system 700 implementing an I/O device 750 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device (e.g., cursor control device, keyboard, or display(s) may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
a plurality of computing nodes implementing a plurality of geographically distributed database groups of a distributed database, each of the geographically distributed database groups comprising a plurality of storage nodes including a master node and one or more secondary nodes, wherein each of the geographically distributed database groups hosts a respective replica of the distributed database, wherein each of the geographically distributed database groups performs one or more write requests responsive to receiving the one or more write requests from clients of a cloud computing service providing the distributed database, wherein the plurality of geographically distributed database groups comprises a master group and one or more secondary groups, and wherein the plurality of computing nodes:
  receive a write request at a secondary group of the plurality of geographically distributed database groups, wherein the write request comprises an update to at least a portion of the distributed database;
  determine, by the secondary group, whether to perform or forward the received write request according to a first type of write consistency associated with the write request, the first type of write consistency being one of a plurality of different types of write consistency provided by the distributed database; and
  responsive to a determination by the secondary group that the first type of write consistency is strong consistency that indicates that the write request should be forwarded instead of performed, forward the write request from the secondary group to the master group of the plurality of geographically distributed database groups.

2. The system of claim 1, wherein the plurality of computing nodes further:
  receive a second write request at the secondary group of the plurality of geographically distributed database groups;
  perform the second write request at the secondary group of the plurality of geographically distributed database groups responsive to the second write request being associated with a second type of write consistency among a plurality of types of write consistency provided by the distributed database, wherein the second type of write consistency is eventual consistency.

3. The system of claim 2, wherein the plurality of computing nodes further:
  synchronize, subsequent to the performance of the second write request, the respective replicas of the master and secondary groups of the plurality of geographically distributed database groups, wherein the synchronization is configured to converge the respective replicas such that the result of the second write request is transferred to the master group of the plurality of geographically distributed database groups.

4. The system of claim 1, wherein the plurality of computing nodes further:
  receive a request to promote a secondary group of the plurality of geographically distributed database groups to be the master group, wherein the master group is identified by a master lease;
  create, responsive to the request to promote the secondary group, a transition lease identifying the secondary group of the plurality of geographically distributed database groups as the next master group.

5. A method, comprising:
receiving a write request at a first node of a plurality of nodes each hosting respective replicas of a distributed database and each performing write requests responsive to receiving the write requests from clients of the distributed database, wherein the write request comprises an update to at least a portion of the distributed database;
determining, by the first node, whether to perform or forward the received write request according to a first type of write consistency associated with the write request, the first type of write consistency being one of a plurality of different types of write consistency provided by the distributed database; and
forwarding the write request to a second node of the plurality of nodes, the second node hosting a master replica of the distributed database;
wherein said forwarding is performed responsive to a determination that the first type of write consistency indicates that the write request should be forwarded instead of performed and responsive to the first node not hosting the master replica.

6. The method of claim 5, further comprising:
synchronizing respective replicas of two or more of the plurality of nodes including the second node hosting the master replica of the distributed database, wherein the synchronization converges the respective replicas such that the data is consistent between the respective replicas, and wherein a conflict resolution policy used in the synchronization is associated with a client application of the distributed database.

7. The method of claim 5, further comprising:
receiving a second write request at the first node of the plurality of nodes;
performing the second write request at the first node of the plurality of nodes responsive to the second write request being associated with a second type of write consistency among a plurality of types of write consistency provided by the distributed database.

8. The method of claim 7, further comprising:
synchronizing, subsequent to the performance of the second write request, the respective replicas of the first and second nodes of the plurality of nodes, wherein the synchronization converges the respective replicas such that the result of the second write request is transferred to the master replica of the second node of the plurality of nodes.

9. The method of claim 5, further comprising:
receiving a request to promote a replica hosted at a third node of the plurality of nodes to be the master replica, wherein the master replica is identified by a master lease;
creating, responsive to the request to promote the replica hosted at a third node, a transition lease identifying the replica hosted at the third node as the next master replica.

10. The method of claim 5, further comprising converting the transition lease, responsive to the expiring of the master lease, into a new master lease.

11. The method of claim 7, wherein performing the second write request at the first node of the plurality of storage groups comprises:
  scheduling the second write request to be performed at the first node of the plurality of nodes; and performing the second write request at the first node of the plurality of nodes.

12. The method of claim 5, wherein the distributed database is a geographically distributed database, wherein the first and second nodes of the plurality of nodes are implemented as part of regional storage groups comprising one or more nodes, and wherein the first and second nodes reside in different geographic regions.

13. A non-transitory computer-readable medium storing program instructions, that when executed by one or more processors, cause the one or more processors to:
receive a write request at a first node of a plurality of nodes each hosting respective replicas of a distributed database and each performing write requests responsive to receiving the write requests from clients of the distributed database, wherein the write request comprises an update to at least a portion of the distributed database;
determine, by the first node, whether to perform or forward the received write request according to a first type of write consistency associated with the write request, the first type of write consistency being one of a plurality of different types of write consistency provided by the distributed database; and
forward the write request to a second node of the plurality of nodes, the second node hosting a master replica of the distributed database;
wherein said forwarding is performed responsive to a determination that the first type of write consistency indicates that the write request should be forwarded instead of performed and responsive to the first node not hosting the master replica.

14. The non-transitory computer-readable medium of claim 13, wherein the program instructions, when executed by the one or more processors, cause the one or more processors to further:
synchronize respective replicas of two or more of the plurality of nodes including the second node hosting a master replica of the distributed database, wherein the synchronization converges the respective replicas such that the data is consistent between the respective replicas, and wherein a conflict resolution policy used in the synchronization is associated with a client application of the distributed database.

15. The non-transitory computer-readable medium of claim 13, wherein the program instructions, when executed by the one or more processors, cause the one or more processors to further:
receive a second write request at the first node of the plurality of nodes;
perform the second write request at the first node of the plurality of nodes responsive to the second write request being associated with a second type of write consistency among a plurality of types of write consistency provided by the distributed database.

16. The non-transitory computer-readable medium of claim 15, wherein the program instructions, when executed by the one or more processors, cause the one or more processors to further:
synchronize, subsequent to the performance of the second write request, the respective replicas of the first and second nodes of the plurality of nodes, wherein the synchronization converges the respective replicas such that the result of the second write request is transferred to the master replica of the second node of the plurality of nodes.

17. The non-transitory computer-readable medium of claim 15, wherein the program instructions, when executed by one or more processors, cause the one or more processors to further schedule the second write request to be performed at a storage node associated with the first node of the plurality of nodes to perform the second write request at the first node of the plurality of nodes.

18. The non-transitory computer-readable medium of claim 13, wherein the program instructions, when executed by the one or more processors, cause the one or more processors to further:
receive a request to promote a replica hosted at a third node of the plurality of computing nodes to be the master replica, wherein the master replica is identified by a master lease;
create, responsive to the request to promote the replica hosted at a third node, a transition lease identifying the replica hosted at the third node as the next master replica.

19. The non-transitory computer-readable medium of claim 18, wherein the program instructions when executed by the one or more processors cause the one or more processors to further convert the transition lease, responsive to the expiring of the master lease, into a new master lease.

20. The non-transitory computer-readable medium of claim 13, wherein the distributed database is a geographically distributed database, wherein the first and second nodes of the plurality of nodes are regional storage groups comprising one or more nodes, and wherein the first and second nodes reside in different geographic regions.

* * * * *